US006318699B1

(12) United States Patent

Williams

(10) Patent No.: US 6,318,699 B1

(45) Date of Patent: Nov. 20, 2001

(54) ENGINE STAND

(76) Inventor: Charles Williams, 2815 No. Tamarack La., Saugus, CA (US) 91350

( * ) Notice: Subject to any disclaimer, the term of this patent is extended or adjusted under 35 U.S.C. 154(b) by 0 days.

(21) Appl. No.: 09/253,657

(22) Filed: Feb. 20, 1999

Related U.S. Application Data

(60) Provisional application No. 60/075,777, filed on Feb. 23, 1998.

(51) Int. Cl.[7] .......... F16M 1/00

(52) U.S. Cl. .......... 248/676; 248/129

(58) Field of Search .......... 248/676, 127, 248/129, 121; 269/17, 56, 50, 51

(56) References Cited

U.S. PATENT DOCUMENTS 2,890,891 * 6/1959 Eurey .......... 248/129 X
2,955,632 * 10/1960 Stone .......... 269/17
3,381,953 * 5/1968 Miller .......... 269/17
4,533,127 * 8/1985 Hawkins .......... 269/17
5,051,056 * 9/1991 Gibbons .......... 269/17
5,165,632 * 11/1992 Kuan .......... 248/129
5,299,659 * 4/1994 Imbeault .......... 269/17 X
5,775,667 * 7/1998 Tassic .......... 248/676

* cited by examiner

*Primary Examiner*—Ramon O. Ramirez
*Assistant Examiner*—Gwendolyn Baxter
(74) *Attorney, Agent, or Firm*—Roger A. Marrs

(57) ABSTRACT

A powered engine stand having a portable framework with front and rear support members joined by a central member and further including an upright post which is rigidly supported by braces on the front member and the central member. The front support member is of shorter length than the rearmost support member and the upright post or stanchion includes a bearing assembly for rotatably mounting a shaft that is cantilevered outwardly towards the rear support member. The shaft is provided with a mounting plate for detachably connecting with fittings on an engine intended to be serviced. The upright post mounts a motor and drive train interconnecting the output of the motor with the shaft carried on the bearing assembly and a control is attached to the motor so that rotation of the engine can be power adjusted.

5 Claims, 2 Drawing Sheets

ENGINE STAND

Peiority claimed based on S/N 60-075,777 filed Feb. 23, 1998.

BACKGROUND OF THE INVENTION

1. Field of the Invention

The present invention relates to the field of engine stands, and more particularly to a novel stand having powered means for controllably locating an engine mounted on a rotatable engine support and which further includes a wheeled frame for moving the stand from one position to another.

2. Brief Description of the Prior Art

In the past, it has been the conventional practice to mount engines on a non-powered engine stand so that the engine is cantilevered outwardly from a support. In this location, a mechanic can reach many areas of the engine which would normally be unavailable without the support in mounting of the engine on a stand. However, problems and difficulties have been encountered with conventional non-powered engine stands which stem largely from the fact that a workman must twist his body into various contortions in order to maneuver heavy engines in an effort to perform maintenance and repair procedures. In some instances, the entire engine must be removed from the stand and then reoriented for remounting onto the stand. Such procedures require substantial work effort and require a longer period of time in order to perform the repair or maintenance procedures. Even when powered stands or platforms have been employed, there has been a lack of speed control wherein the mounted engine is moved too rapidly to attain accuracy of work position. Also, most powered conventional stands are limited to short block assemblies since there is not enough drive reduction to attain the purposes desired by the mechanic. Additionally, conventional engine stands are very large in size and are difficult to move from place to place.

Prior attempts to provide suitable engine stands are disclosed in U.S. Pat. Nos. 5,562,271; 5,238,126; 5,381,575 and 4,809,963. All of these prior references suffer from the above noted problems.

Therefore, a long-standing need has existed to provide a novel powered engine stand which has the ability to rotate a mounted engine and to position complete engine assemblies easily.

SUMMARY OF THE INVENTION

Accordingly, the above problems and difficulties are avoided by the present invention which provides a novel powered engine stand having a portable framework with front and rear support members joined by a central member and further including an upright post or stanchion which is rigidly supported by braces on the front member and the central member. The front support member is of shorter length than the rearmost support member and the upright post or stanchion includes a bearing assembly for rotatably mounting a shaft that is cantilevered outwardly towards the rear support member. The terminating end of the shaft is provided with a mounting plate for detachably connecting with fittings on an engine intended to be serviced. Also mounted on the upright post or stanchion is a motor means and drive train interconnecting the output of the motor means with the shaft carried on the bearing assembly and a control means is attached to the motor means so that rotation of the engine mounted on the support plate or mount can be power adjusted. A feature of the invention resides in employment of a large D.C. motor and gearbox combination with a variable speed control. Ballbearing assemblies are used in the bearing assembly for ease of shaft rotation while under load during support of a heavy engine on the mounting plate or mount. A hand-held pendant, or stationary box, mounts the controls so that the mechanic can readily move about the stand and rotate the engine through the control box, or the remote pendant in his hand. This is provided by employing an adjustable height, swivel pendant arm upwardly projecting from the top of the support post or stanchion.

Therefore, it is among the primary objects of the present invention to provide a novel powered engine stand capable of positioning and removing heavy engines in an effortless manner.

Another object of the present invention is to provide an engine stand having a D.C. motor and gearbox which is controllable by means of a remote control pendant which is movable about an axis of rotation.

Still another object of the present invention is to provide a powered engine stand capable for heavy duty or constant use and which includes speed control for adjusting the rotational movement of an engine mounted on a rotatable mounting plate.

Still another object resides in providing a powered engine stand which has suitable speed control, drive reduction and proper bearing support for rotatably mounting heavy engines in a cantilevered manner from a support post or stanchion.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
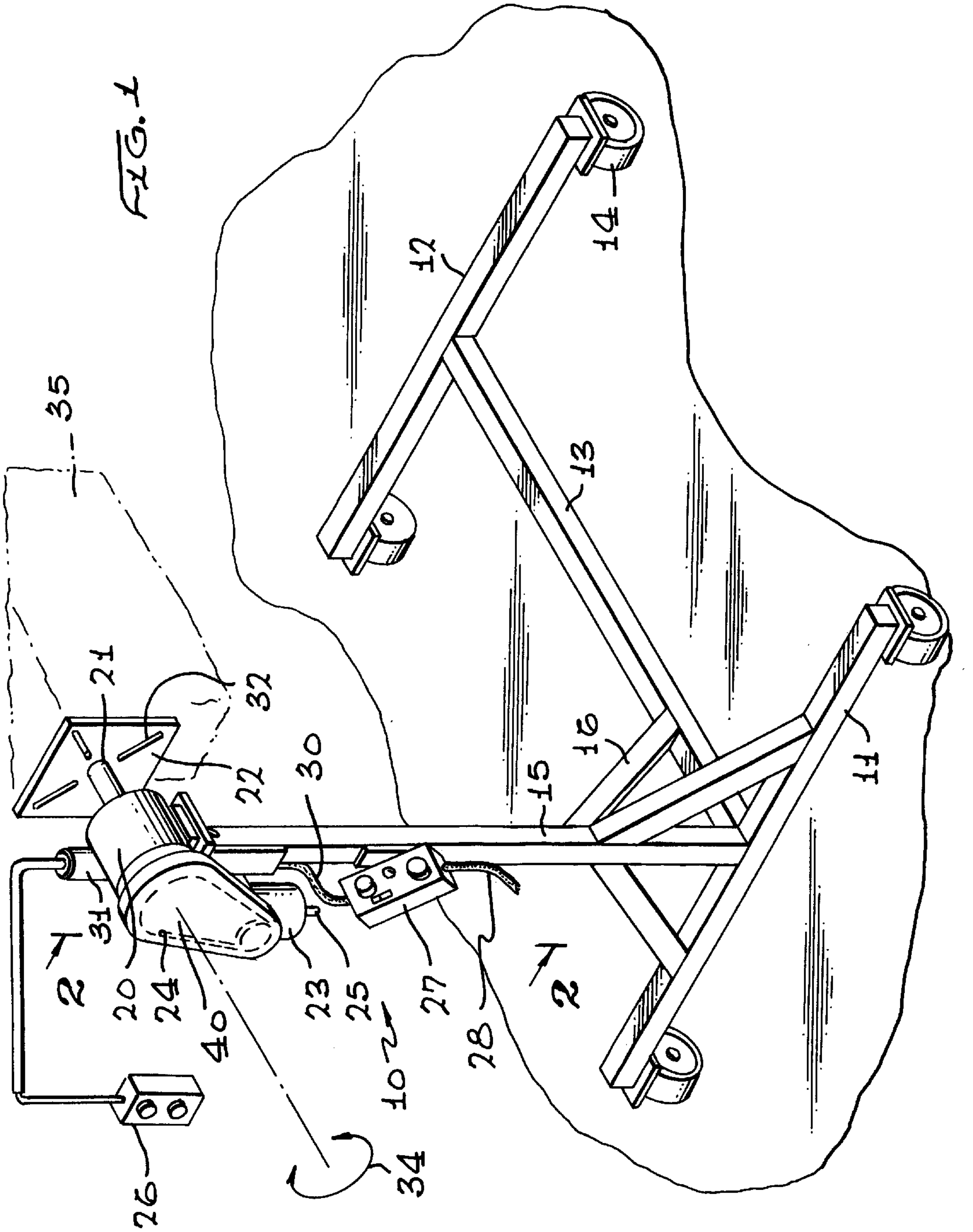
FIG. 1 is a front perspective view of the novel powered engine stand incorporating the present invention.

Referring to FIG. 1, the novel powered engine stand of the present invention is illustrated in the general direction of arrow 10 which includes a framework having a front support member 11 and a rear support member 12. The support members are elongated and the rear support member 12 is of shorter length than the front support member 11. The two support members are connected together by a central member 13 having its opposite ends secured to the midsection of the respective support members 11 and 12. The frame further includes wheels at the terminating ends of the respective support members and such a typical wheel is identified by numeral 14. The frame further includes an upright post or stanchion 15 which is held in a rigid position by means of braces forming a triangular support. A typical brace is indicated by numeral 16. At the top of the post or stanchion 15, there is provided a bearing assembly 20 which supports a locating shaft 21 having a mounting plate 22 carried on the end thereof. The plate 22 revolves in unison as the shaft 21 rotates. Location of the shaft 21 is under control of a drive motor 23 through a drive train or belt drive or chain drive, as indicated by numeral 24. The motor 23 is of the D.C. type and if it is desired to manually rotate the shaft 22 via the drive chain 24, a fitting 25 is carried on the motor that may be detachably connected with a suitable wrench, crank or the like for turning purposes. The control of the motor 23 is by means of a remote control 26 having suitable control buttons and electrical circuit connected to the motor and/or control box 27. The control box includes control circuits and switches which couple a power cable 28 with the motor via a cable 30. The control box 27 includes switches for turning the motor on and off as required as well as controlling the speed of the motor. The remote control box 26 is carried by a swivel arrangement 31 on the post 15 so that the mechanic may hold the box 26 in his hand and move about the stand while the control cable rotates in the swivel fixture 31.

An engine to be repaired or maintained is coupled to the exposed face of the mounting plate 22 by means of fasteners carried on the engine which are placed through specifically located slots, such as slot 32. When fastened to the mounting plates, the engine may be rotated about the longitudinal axis of the engine and shaft 21 in accordance with the arrows indicated by numeral 34. Furthermore, the entire engine stand 10 may be moved while supporting the engine, as indicated by numeral 35, and the stand may be moved even with the shaft and engine rotating under control from either boxes 26 or 27.

Figure 2:
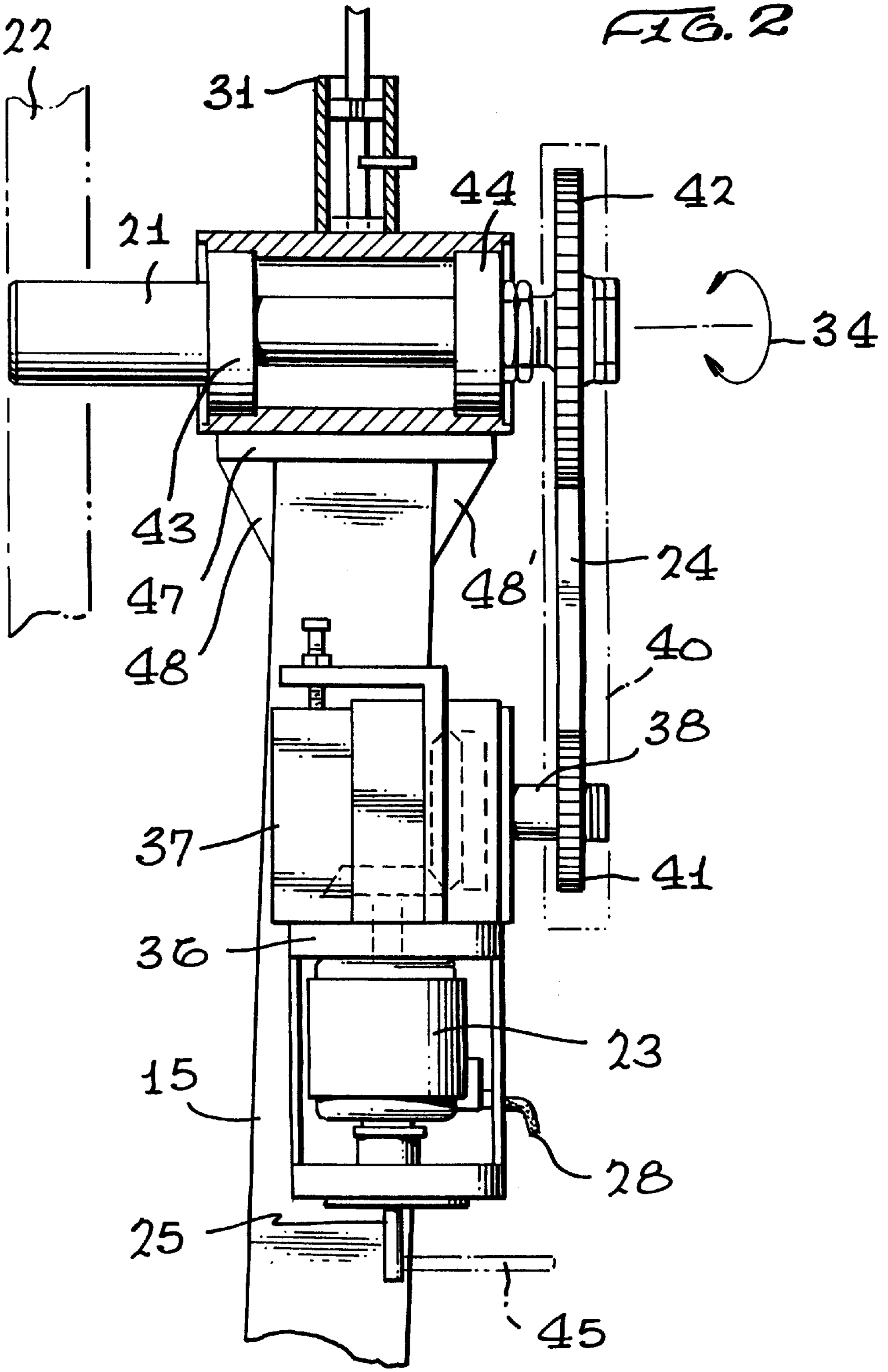
FIG. 2 is an enlarged front elevational view, partly in section, of the novel powered engine stand shown in FIG. 1 as taken in the direction of arrows 2—2 thereof.

Referring now in detail to FIG. 2, it can be seen that the motor 23 is enclosed in a suitable housing and that the output of the motor 23 is introduced to a gearbox 37 which converts the rotary motion of the motor's drive-shaft to rotary movement of the shaft 38. In the present embodiment of the invention, a gear is placed on the end of shaft 38 and is engaged by a chain 30 which is included within the drive train housing 24. Preferably, the gear box is of a gear reduction type and the chain 30 encircles and meshes with a larger gear placed on the end of shaft 21. The smaller gear is identified by numeral 41 while the larger gear is identified by numeral 42.

It can also be seen that the shaft 21 is mounted in a bearing assembly 20 which includes ball bearing braces 43 and 44 so that rotation of shaft 21 is smooth and properly supported. The motor 23 is preferably of a permanent magnetic type and it is repeated that the drive train 24 may take the form of a chain drive, a belt drive or a gear drive. A crank of wrench for manually turning the shaft 25 is indicated by numeral 45.

FIG. 2 also illustrates that the bearing assembly 20 is secured atop a platform 37 which is supported by braces 48 and 48' that are secured to the top of post or stanchion 15. The post or stanchion 15 is also upwardly projecting from the support member 11 at a slight angle so that it is other than perpendicular. The slant or angle is away from the rear member 12 so that as the engine is supported on the mounting plate 22, the weight of the engine is more readily accommodated. Therefore, heavy engines can be conveniently handled by the powered engine stand of the present invention.

In view of the foregoing, it can be seen that the powered engine stand of the present invention is acceptable for heavy duty or constant use. The bearing assembly employs tapered bearing support for the rotating shaft 21 and a suitable drive train 24 rotates the shaft via the D.C. motor 23 via the gearbox 37. By employing this structure, a mechanic can easily and conveniently rotate and position complete engines which are detachably mounted on the mounting plate 22. The positioning of the engine or any other workpiece is accurate and is easily achieved through the D.C. power and the use of a variable speed control. A mechanic can perform more work on an engine or a workpiece in a shorter period of time than can be done on conventional non-powered work stands. The hand-held control box or pendant 26 permits the mechanic to move about the engine stand and the engine while having complete control over engine rotation and support. The primary advantages of the inventive concept include effortless rotation of engine or any other heavy workpiece and the ability to perform more work in a shorter period of time than can conventionally be achieved. The present invention lessens injury which is normally due to manual rotation of heavy loads and conventional stands and the present inventive power stands supports heavy stands and workpieces without the need for external reinforcements.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A powered engine stand for rotatably positioning a heavy engine comprising:

a rollable base;

an unright post secured to said post;

support means on said post for movably supporting an engine;

powered means carried on said post and operably coupled to said support means for controllably rotating said engine;

said support means includes a rotatable shaft cantilevered outwardly from a selected end of said post;

a mounting plate carried on said shaft in close proximity to said post for detachably retaining said engine in a cantilevered position over said base;

said powered means includes a D. C. motor operably connected to said shaft;

a speed control coupled to said motor;

a drive reduction mechanism interconnecting said motor with said shaft;

a bearing interposed between said motor and said shaft; and said control means includes a hand-held pendant mounted on said post by a swivel whereby a mechanic can readily move about said post and base in controllable operation of said motor operation and engine rotation.

2. The powered engine stand defined in claim 1 wherein:

said base includes a portable framework with a front and a rear beam member joined by a central beam member;

said post secured to a joint connection between said central beam member and said front beam member; and said post being normal or perpendicular to said framework.

3. The powered engine stand defined in claim 2 wherein:

said engine includes mounting fittings and said mounting plate includes a plurality of slots for receiving and connecting with said engine mounting fittings.

4. The powered engine stand defined in claim 3 wherein:

said bearing is a ball bearing assembly.

5. The powered engine stand defined in claim 4 wherein:

said control means includes a control box secured to said post; and a drive train interconnecting said D.C. motor with said rotatable shaft.

* * * * *